United States Patent [19]

Kadokura et al.

[11] Patent Number: 4,498,931

[45] Date of Patent: Feb. 12, 1985

[54] PIGMENTED ALUMINUM OXIDE POWDER AND METHOD OF PRODUCING THE SAME

[75] Inventors: Hidekimi Kadokura; Hiroshi Umezaki, both of Niihama, Japan

[73] Assignee: Sumitomo Chemical Company, Limited, Osaka, Japan

[21] Appl. No.: 509,808

[22] Filed: Jun. 30, 1983

[30] Foreign Application Priority Data

Jul. 9, 1982 [JP] Japan ............................. 57-120351

[51] Int. Cl.$^3$ .................. C04B 31/02; C08K 3/04; C09C 1/44
[52] U.S. Cl. ............................. 106/307; 106/288 B; 106/308 B; 106/309
[58] Field of Search ............... 106/307, 308 B, 309, 106/288 B

[56] References Cited

U.S. PATENT DOCUMENTS 3,488,204  1/1970  Jordan et al. ............... 106/308 B
4,076,551  2/1978  Bernhard et al. ............ 106/308 B
4,108,679  8/1978  Szczepanik et al. ......... 106/308 B Primary Examiner—Herbert S. Cockeram
Attorney, Agent, or Firm—Wenderoth, Lind & Ponack

[57] ABSTRACT

Pigmented aluminum oxide powders are provided herein obtained by adding at least 0.5 wt. % of carbon black to aluminum oxide powder, said carbon black having a mean particle size of less than about 100 mn and a specific surface area more than 30 m$^2$/g, and mixing the aluminum oxide powder-carbon black composition under an impact value of more than 1 G, preferably by use of a vibration mill. The present invention also provides a method of producing said pigmented aluminum oxide powder.

10 Claims, No Drawings

PIGMENTED ALUMINUM OXIDE POWDER AND METHOD OF PRODUCING THE SAME

The present invention relates to a method of producing pigmented aluminum oxide powder, especially black colored aluminum oxide powder, for use as a filler or additive.

Aluminum oxide powder is white, and moreover it is excellent in insulating properties, wear resistance, thermal conductivity, etc., so that it is favorably utilized as a filler for epoxy resin for use as semiconductor integrated circuit package covering, or as a filler for molded bodies of general use plastics, for example polyethylene, polypropylene, polyvinyl chloride, polymethyl methacrylate, etc.

However, depending on its use purposes, there may be cases where properties that can mask harmful light or provide electroconductivity are required, in addition to the above-mentioned properties.

To satisfy such requirements, a method can be easily thought of, wherein aluminum oxide powder is mixed with a pigment such as carbon black by a blender or both are mixed by stirring in a solution and thereafter dried to cover the aluminum oxide powder with the pigment.

However, in the use as mentioned above, film formation is performed after the filler, etc. is added to a medium in which a resin has been dissolved in a solvent and mixed by stirring, so that the black filler produced by the above-mentioned conventional method separates partly into aluminum oxide and carbon black during the mixing in the solvent. Therefore the film obtained therefrom exhibits uneven coloring or assumes white color which is the original color of aluminum oxide. Thus, such a film has no substantial value in applications in which light-masking or electroconductivity is required.

We made various studies to overcome the above-mentioned defect, and as a result we have found that such disadvantage can be eliminated when carbon black having a special particle size and specific surface area is mixed with aluminum oxide powder under a particular mixing condition. The present invention has been accomplished on the basis of this discovery.

The present invention consists in providing pigmented aluminum oxide powder obtained by adding to aluminum oxide powder, more than 0.5 weight % of a carbon black having a mean particle size less than 100 nm and a specific surface area more than 30 $m^2/g$ and mixing them under the condition of an impact value more than 1 G (G being the acceleration of gravity).

In the following the present invention will be explained in further detail: The pigmented aluminum oxide powder of the present invention assumes a grayish black or black color, and on dispersing it in an organic solvent for resin film formation, there is no separation into aluminum oxide and carbon black, so that it satisfies the coloring purpose sufficiently. In addition, it has a very high wear resistance, thermal and electric conductivity. Therefore the pigmented aluminum oxide powder of the present invention has a very high industrial value.

The particle size of the aluminum oxide powder to be used in the present invention is not particularly limited. However, when it is used as a filler for electronic parts, the surface smoothness of the shaped body becomes extremely low at a mean particle size larger than 2 $\mu m$, and therefore there is used one having a particle size less than 2 $\mu m$, preferably from 0.01 to 1 $\mu m$.

As for the carbon black to be used in the present invention as the coloring pigment, it is necessary that it has a mean particle size less than 100 nm and a specific surface area more than 30 $m^2/g$.

The particle size and specific surface area of carbon black are the factors that require the utmost consideration. In the case where the carbon black has a mean particle size more than 100 nm or a specific surface area less than 30 $m^2/g$, the black filler, when dispersed in a solvent, will separate into aluminum oxide powder and carbon black, and therefore such carbon black is undesirable.

Carbon black having a mean particle size larger than one third the mean particle size of aluminum oxide powder, when dispersed in a solvent, will separate from aluminum oxide and bring about coloring unevenness, and therefore such carbon black is not desirable. Particularly preferred is carbon black having a mean particle size from 5 to 50 nm and also 1/5 to 1/30 the mean particle size of aluminum oxide powder, and a specific surface area more than 100 $m^2/g$.

In the production of the pigmented aluminum oxide of the present invention, the mixing ratio of carbon black to aluminum oxide is at least more than 0.5 weight % and preferably more than 1 weight %.

If the mixed ratio of carbon black is less than 0.5 weight %, the expected effect will not be obtained. Even if it is too much, there is no problem in coloring, and therefore the ratio should be suitably selected depending on the use purpose of the final product.

Upon producing the pigmented aluminum oxide of the present invention, it is essential to mix aluminum oxide powder and carbon black under the condition of an impact value more than 1 G, preferably from 3 G to 15 G. Only under such mixing condition, it is possible to obtain excellent pigmented aluminum oxide powder which assumes the black color aimed at and is free from coloring unevenness, and in addition, which when dispersed in a solvent exhibits less occurrence of the phenomenon of separating into aluminum oxide and carbon black. Such mixing condition can be achieved by pulverization or grinding by means of a vibration mill, ball mill, etc.

The time required for pulverization or grinding is generally from 1 minute to 10 hours.

The expected object cannot be attained by mixing by means of a V-type mixer as in the conventional method of compounding a pigment with a resin, or by adding various additives to a solvent solution of a resin and mixing under stirring.

It is not fully understood why in the pigmented aluminum oxide of the present invention the aluminum oxide and carbon black are bound firmly and do not separate from each other even when dispersed in a solvent. However, a possible supposition of the reason is that, when carbon black having a special particle size and specific surface area is mixed with aluminum oxide under a particular condition, the aluminum oxide and carbon black cause a mechano-chemical reaction.

Upon grinding or pulverization and mixing of the two starting materials, their particle sizes become smaller by the action of grinding or pulverization. However, aluminum oxide powder and carbon black, which are the constituent elements of the pigmented aluminum oxide to be obtained, desirably have the above-mentioned relation of particle size and specific surface area.

Upon producing the pigmented aluminum oxide powder of the present invention, additives other than the coloring component may be added, depending on its use purpose.

Since the pigmented aluminum oxide powder of the present invention detailed hereinbefore exhibits least separation into aluminum oxide and carbon black, the coloring is remarkably fast, so that it can be very effectively used as a filler or additive for applications in which harmful light should be masked or its electroconductivity is utilized.

The pigmented aluminum oxide powder of the present invention is particularly suitable as a filler or additive for plastics for use in electronic parts for which wear resistance and thermal conductivity are required.

In the following, the pigmented aluminum oxide powder of the present invention will be explained in more detail by way of Examples, but the invention is not limited to these Examples so far as it does not deviate from the spirit of the invention.

EXAMPLE 1

Aluminum oxide powders having the mean primary particle sizes shown in Table 1 and carbon blacks having the mean particle sizes and BET specific surface areas shown in Table 1 were each charged in a vibration mill (6 G) in amounts shown in Table 1 and were pulverized and mixed for 12 minutes.

The degree of coloring of the pigmented aluminum oxide powders thus obtained was judged according to the following method:

(1) The pigmented aluminum oxide powder as taken out of the vibration mill is visually observed.
(2) Five weight parts of the pigmented aluminum oxide powder as taken out of the vibration mill is charged into a beaker together with 60 weight parts of a mixed solvent composed of the following ratio:
methyl ethyl ketone:methyl isobutyl ketone:toluene = 1:1:1 (weight ratio)
After stirring for one hour, the suspension is allowed to stand and settle. The upper layer of the precipitate is visually observed.

In the visual observations (1) and (2), when aluminum oxide powder not colored by carbon black is not seen at all, such is shown in Table 1 by the sign O; when seen a little, by the sign Δ; and when seen much, by the sign X.

In the following Examples, these observations are called Test (1) and Test (2).

TABLE 1

| Experiment No. | Aluminum oxide powder Mean primary particle size (μm) | Aluminum oxide powder Charged amount (weight parts) | Carbon black Mean particle size (nm) | Carbon black BET (m²/g) | Carbon black Charged amount (weight parts) | Degree of coloring Test (1) | Degree of coloring Test (2) |
|---|---|---|---|---|---|---|---|
| 1 | 0.5 | 50 | 30 | 950 | 5 | | |
| 2 | " | " | 14 | 700 | 5 | | |
| 3 | " | " | 35 | 270 | 10 | | |
| 4 | 0.3 | " | 30 | 950 | 5 | | |
| 5 | 0.5 | " | 18 | 140 | 5 | | |
| 6 | " | " | 50 | 50 | 5 | | Δ |
| 7 | " | " | 30 | 950 | 1 | | |
| 8 (comparative example) | " | " | 30 | 950 | 0.1 | X | X |
| 9 (comparative example) | " | " | 80 | 25 | 5 | | X |
| 10 (comparative example) | " | " | 150 | 16 | 5 | Δ | X |

From Table 1, it is apparent that aluminum oxide powder having a high degree of coloring fastness can be produced by pulverizing and mixing aluminum oxide powder and carbon black having a special particle size and specific surface area.

EXAMPLE 2

Fifty weight parts of aluminum oxide powder having a mean primary particle size of 0.5 μm and 5 weight parts of carbon black having a mean particle size of 30 nm and a BET specific surface area of 950 m²/g, were charged into a ball-mill and were ground and mixed for 30 minutes.

The result of Test (1) for the degree of coloring of the pigmented aluminum oxide powder thus obtained was "O" and the result of Test (2) was "O".

For comparison, the above-mentioned starting materials were mixed by means of a V-type mixer for 30 minutes.

The result of Test (1) for the degree of coloring of the pigmented aluminum oxide powder thus obtained was "X" and the result of Test (2) was "X".

From the above experiments, it is understood that the degree of coloring fastness of the pigmented aluminum oxide powder of the present invention is very high.

What we claim is:

1. Pigmented aluminum oxide powder obtained by adding to aluminum oxide powder, more than 0.5 weight % of carbon black having a mean particle size less than 100 nm and a specific surface area more than 30 m²/g, and mixing them under the condition of an impact value more than 1 G.

2. The pigmented aluminum oxide powder as claimed in claim 1, characterized by using as the carbon black, a carbon black having a mean particle size from 5 to 50 nm and a specific surface area more than 100 m²/g.

3. A method of producing pigmented aluminum oxide powder characterized by adding to aluminum oxide powder, more than 0.5 weight % of carbon black having a mean particle size less than 100 nm and a specific surface area more than 30 m²/g, and mixing them under the condition of an impact value more than 1 G.

4. The method of producing pigmented aluminum oxide powder as claimed in claim 3, characterized by using as the carbon black, a carbon black having a mean particle size from 5 to 50 nm and a specific surface area more than 100 m²/g.

5. The method of producing pigmented aluminum oxide powder as claimed in claim 3 or claim 4, wherein an impact value more than 1 G is provided by means of mixing with a vibration mill.

6. The method of producing pigmented aluminum oxide powder as claimed in claim 3, wherein an impact value of more than 1 G is provided by mixing with a vibration mill.

7. The pigmented aluminum oxide powder as claimed in claim 1, wherein the aluminum oxide powder has a mean particle size less than 2 μm.

8. The method according to claims 3 or 4 wherein the aluminum oxide powder has a mean particle size less than 2 μm.

9. The pigmented aluminum oxide powder as claimed in claim 1 in which the aluminum powder has a mean particle size from 0.01 to 1 μm.

10. The method according to claims 3 or 4 wherein the aluminum powder has a mean particle size from 0.01 to 1 μm.

* * * * *